United States Patent [19]

Takeyama et al.

[11] Patent Number: 4,964,375
[45] Date of Patent: Oct. 23, 1990

[54] VALVE OPERATING MECHANISM

[75] Inventors: Satoshi Takeyama; Yasuo Matsumoto, both of Yokohama, Japan

[73] Assignee: Nissan Motor Co., Ltd., Yokohama, Japan

[21] Appl. No.: 280,856

[22] Filed: Dec. 7, 1988

[30] Foreign Application Priority Data

Dec. 8, 1987 [JP] Japan ............................. 62-187044[U]
Dec. 15, 1987 [JP] Japan ................................. 62-317190
Dec. 15, 1987 [JP] Japan ............................. 62-190257[U]

[51] Int. Cl.⁵ ........................................... F02B 15/00
[52] U.S. Cl. .................................... 123/315; 123/90.16
[58] Field of Search ..................... 123/315, 90.16, 432, 123/347, 90.15

[56] References Cited

U.S. PATENT DOCUMENTS

| | | | |
|---|---|---|---|
| 3,334,618 | 8/1967 | Funiciello | 123/315 |
| 4,108,119 | 8/1978 | McWhorter | 123/315 |
| 4,519,365 | 5/1985 | Anfusio | 123/315 |
| 4,651,684 | 3/1987 | Masuda et al. | 123/315 |
| 4,714,059 | 12/1987 | Masuda et al. | 123/315 |
| 4,735,186 | 4/1988 | Parsons | 123/315 |
| 4,765,287 | 8/1988 | Taylor et al. | 123/315 |

FOREIGN PATENT DOCUMENTS

| | | | |
|---|---|---|---|
| 3332789 | 3/1984 | Fed. Rep. of Germany | |
| 3621080 | 1/1987 | Fed. Rep. of Germany | |
| 0099036 | 6/1904 | Japan | 123/315 |
| 49-17967 | 7/1974 | Japan | |
| 0151115 | 11/1980 | Japan | 123/315 |
| 2172051 | 9/1986 | United Kingdom | |

Primary Examiner—David A. Okonsky
Attorney, Agent, or Firm—Pennie & Edmonds

[57] ABSTRACT

A valve operating mechanism for an internal combustion engine having a plurality of exhaust valves per cylinder comprises a device for driving the exhaust valves in a same cylinder at such a valve timing that makes opening of the exhaust valves with a phase difference, i.e., at different timings relative to a crank angle. In one aspect of this invention, the exhaust valves open at the different times and close at the same time.

13 Claims, 10 Drawing Sheets

VALVE OPERATING MECHANISM

BACKGROUND OF THE INVENTION

I. Field of the Invention

The present invention relates to a valve operating mechanism for an internal combustion engine having a plurality of exhaust valves per cylinder.

II. Description of the Prior Art

In an internal combustion engine for automotive vehicles, etc., having a plurality of exhaust valves and a plurality of intake valves per cylinder, it has been proposed to operate at the different valve timings the exhaust valves and the intake valves, respectively.

A prior art valve operating mechanism of the above described kind, as for example disclosed in Japanese Patent Publication No. 49-17967, is adapted to operate two exhaust valves and two intake valves of a four-stroke cycle four-valves-per-cylinder internal combustion engine at the valve timings as shown in FIG. 1 of the Publication. That is, the valve timings E1 and E2 of the two exhaust valves and the valve timings I1 and I2 of the two intake valves respectively have such predetermined phase differences that at the positions of the piston adjacent the top dead center in the transition from the exhaust stroke to the intake stroke a set of one exhaust valve and one intake valve are closed and a set of the other exhaust valve and the other intake valve are opened with a view to increasing the velocity of flow of the fresh intake mixture within the cylinder and thereby improving the scavenging efficiency. Further, at the position of the piston adjacent the bottom dead center in the transition from the intake stroke to the compression stroke, only one of the intake valves is opened to cause a swirl of the intake mixture for thereby improving the combustibility during high-speed high-load operation of the engine.

In the valve operating mechanism of the above described type, a phase difference is provided to the timings at which the two exhaust valves fully close. Due to this, the effective area of the opening defined by the exhaust valves at the time of the valve overlap in which the intake and exhaust valves are held open simultaneously is small, thus resulting in that a long valve overlapping period is necessitated in order to fully attain an inertia supercharging effect of the intake mixture during high-speed high-load operation of the engine.

However, when the valve overlapping period is set to be long, the exhaust gases flow reversely into the cylinder, drawn by a large intake vacuum though the area of the opening defined by the exhaust valves, thus increasing the quantity of the residual gases during low-speed low-load operation of the engine in which the supply of intake mixture is small, thus largely deteriorating the combustibility.

SUMMARY OF THE INVENTION

In accordance with the present invention, there is provided a novel valve operating mechanism for an internal combustion engine having a plurality of exhaust valves per cylinder.

The valve operating mechanism comprises means for driving the exhaust valves at such a valve timing that makes opening of the exhaust valves and causes back flow pressures with a phase difference.

This structure is effective for solving the above noted problems inherent in the prior art device.

It is accordingly an object of the present invention to provide a novel valve operating mechanism for an internal combustion engine having a plurality of exhaust valves per cylinder, which can reduce the magnitude of the blowdown pressure caused by the opening of the exhaust valves and thereby reducing the above noted drop of engine output torque.

It is another object of the present invention to provide a novel valve operating mechanism of the above described character which can reduce the quantity of the exhaust gases reversely flowing into the cylinder due to valve overlap during low-speed low-load operation of the engine and, thus attaining the idling stability.

DESCRIPTION OF THE PREFERRED EMBODIMENTS

Figure 1:
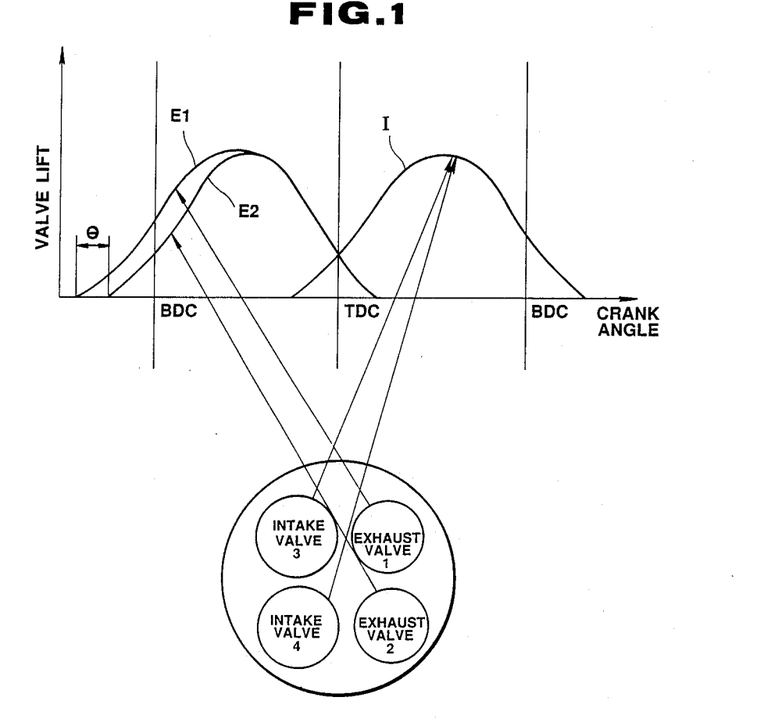
FIG. 1 is a valve timing diagram according to an embodiment of the present invention.

Referring to FIG. 1, the curves E1 and E2 and the curve I depict valve timings for a four-stroke cycle four-valves-per-cylinder internal combustion engine according to an embodiment of the present invention.

The curves E1 and E2 represent the valve timings of exhaust valves 1 and 2, respectively. The exhaust valves 1 and 2 start opening in advance of the bottom dead center (BDC) after which the exhaust stroke begins and with a phase difference $\theta$. The exhaust valves 1 and 2 then reach the maximum lift points in the middle of the exhaust stroke, respectively and fully close synchronously with each other in retard of the top dead center (TDC) after which the intake stroke begins. Closing movements of the exhaust valves 1 and 2 are synchronous with each other, i.e., performed at the same speed.

The curve "I" represents a valve timing common to intake valves 3 and 4. The intake valves 3 and 4 start opening in advance of the top dead center, reach a maximum lift point in the middle of the exhaust stroke and fully close in retard of the bottom dead center after which the compression stroke begins. With those valve timings, the exhaust valves 1 and 2 and intake valves 3 and 4 are given a predetermined valve overlapping angle about the top dead center.

Figure 2:
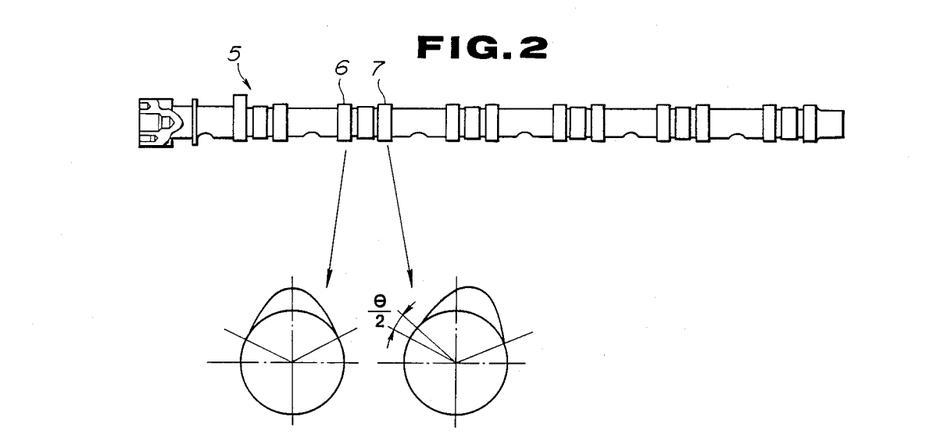
FIG. 2 is a side elevation of an exhaust valve operating camshaft utilized in the embodiment of FIG. 1.

FIG. 2 shows a camshaft 5 for the exhaust valves 1 and 2. The camshaft 5 has cams 6 and 7 which are so profiled as to have a phase difference of $\theta/2$ at the opening valve points and a phase difference of 0 (zero) at the closing valve points.

Figure 3:
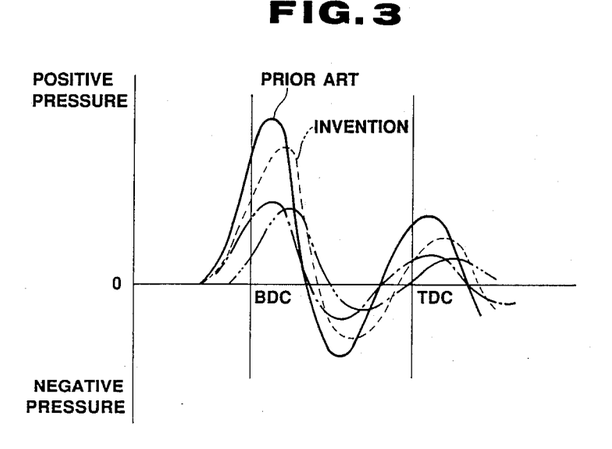
FIG. 3 is a diagram illustrating a variation amplitude of a pressure wave in an exhaust passage in the embodiment of FIG. 1 in comparison with that in the comparable prior art device.

In FIG. 3, the dotted line curve indicates the pressure wave occurring in the exhaust passages downstream of the exhaust valves 1 and 2. The pressure wave results from the composition of a blowdown pressure (indicated by the one-dot-chain line curve) produced by the opening of the exhaust valve 1 and a blowdown pressure (indicated by the two-dot-chain line curve) produced by the opening of the exhaust valve 2. Therefore, the vibration amplitude of the pressure wave in the embodiment of this invention can be smaller than that (indicated by the solid line curve) in the prior art device of which exhaust valves open at the same time, i.e., with the same phase.

Figure 4:
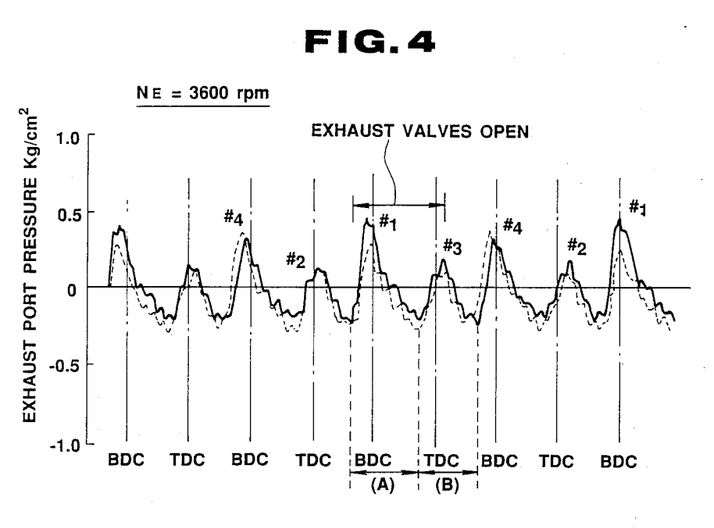
FIG. 4 is a diagram illustrating variations of an exhaust port pressure in the embodiment of FIG. 1 in comparison with that in the comparable prior art device.

FIG. 4 shows by the dotted line curve the pressure variations of the pressure wave measured under the condition that the engine is operated at the speed of 3600 rpm so that the pressure wave becomes positive in the place spaced by 120 mm downstream of the exhaust valves 1 and 2 upon closure of the exhaust valves 1 and 2. In the figure, the solid line curve represents the pressure variations of the pressure wave in the comparable prior art device in which the exhaust valves open with the same phase. From this test result, it will be understood that according to the present invention the variation amplitude of the reflected wave (the portion indicated by "B") can be made smaller by the amount corresponding to the amount by which the blowdown (the portion indicated by "A") is reduced.

Figure 5:
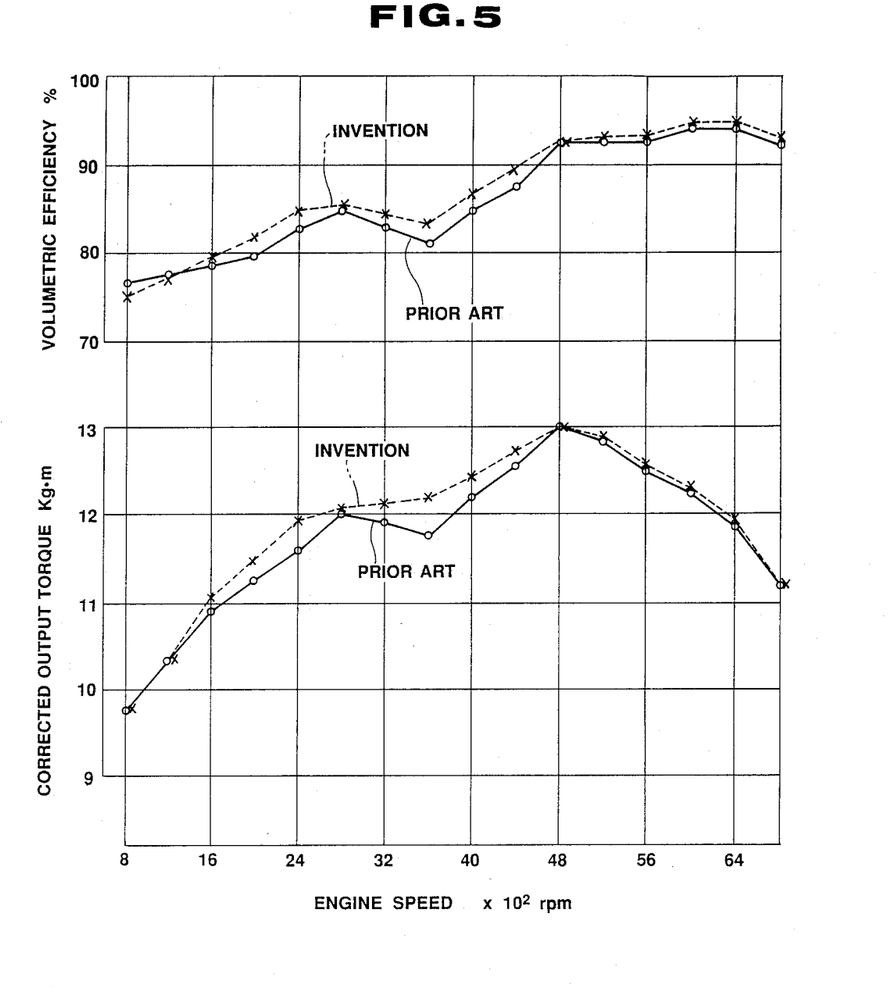
FIG. 5 is a graph depicting variations of an engine output torque and a volumetric efficiency relative to an engine speed in the embodiment of FIG. 1 in comparison with that of the prior art device.

FIG. 5 shows, with respect to the embodiment of this invention and the prior art device, how the engine ouput torque and volumetric efficiency vary with variation of the engine rpm. From this graph, it will be understood that while in case of the prior art device there occurs a considerable drop or fall of the output toruqe and volumetric efficiency at or near the engine speed of 3600 rpm, a corresponding drop is smaller in case of this embodiment.

The drop of the output torque is caused by the closure of the exhaust valves 1 and 2 at or near the engine speed of 3600 rpm which, as having been described above, causes a positive pressure on the downstream side of the exhaust valves 1 and 2. In case of this embodiment, the back flow pressures are produced with a predetermined phase difference, i.e., at the different timings relative to the crank angle by the opening of the exhaust valves 1 and 2, thus making smaller vibration amplitude of the pressure wave occuring in the exhaust passage, reducing the pumping loss caused by the consumption of the engine output for discharging the exhaust gases, reducing the residual gases while increasing the volumetric efficiency of the intake mixture and making it possible to prevent a drop of an output torque during middle speed operation of the engine.

Further, by making the exhaust valves 1 and 2 fully close at the same time, i.e., synchronously with each other, it becomes possible to increase the effective area of opening defined by the exhaust valves 1 and 2 at the time of the valve overlap in which the exhaust valves 1 and 2 are opened together with the intake valves 3 and 4, thus making it unnecessary to set a long valve overlapping period. As a result, it becomes possible to retain the volumetric efficiency by utilizing the inertia of the intake mixture during high-speed high-load operation of the engine while at the same time preventing the exhaust gases from reversely flowing into the engine cylinder drawn by the intake vacuum during low-speed low-load operation of the engine. This prevents the combustibility deterioration of the fuel mixture caused by the residual exhaust gases, thereby improving the idling stability, etc.

Figure 6:
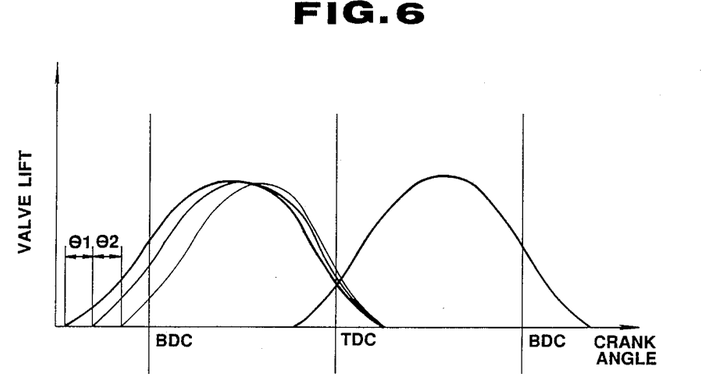
FIG. 6 is a valve timing diagram according to another embodiment.

FIG. 6 shows another embodiment in which the engine is of the type having three exhaust valves per cylinder, and the exhaust valves start opening at different timings so as to provide phase differences $\theta 1$ and $\theta 2$ and fully close at the same time, i.e., synchronously with each other though closing movments of the exhaust valves are performed at different speeds.

When this is the case, since three exhaust valves start opening with phase differences from each other, the blowdown pressures are produced at the three different timings, thus making it possible to further reduce the variation amplitude of the pressure wave occuring in the exhaust passage.

Figure 7:
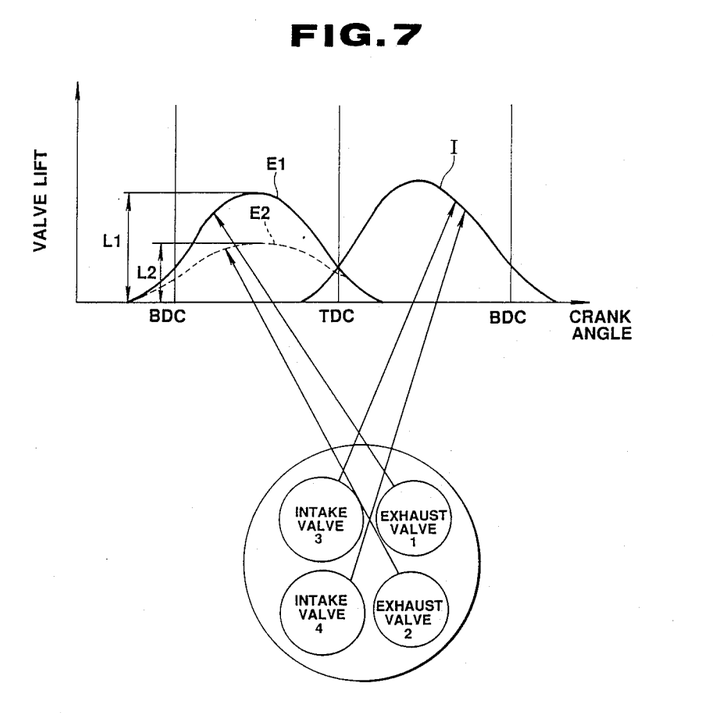
FIG. 7 is a valve timing diagram according to a further embodiment.
Figure 8:
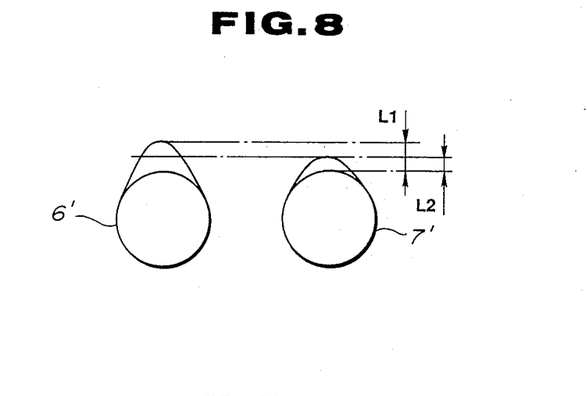
FIG. 8 is a schematic view of exhaust cam lobes employed in the embodiment of FIG. 7.

FIG. 7 shows a further embodiment in which the valve timings E1 and E2 cause the exhaust valves 1 and 2 to start opening at the same time, i.e., synchronously with each other in advance of the bottom dead center after which the intake stroke begins but increase in degree of opening at different speeds so as to reach different maximum lift points in the middle of the exhaust stroke. To this end, as shown in FIG. 8, exhaust cam lobes 6' and 7' are constructed so that the maximum lift L2 of one exhaust valve 2 is about one half of the maximum lift L1 of the other exhaust valve 1. Further, the cam lobes 6' and 7' are constructed so that the valve opening speed of the exhaust valve 2 is about half of that of the exhaust valve 1. In the meantime, the maximum lift L1 of the exhaust valve 1 is set so as to be substantially equal to the maximum lift of the intake valves 3 and 4.

Except for the above, this embodiment is substantially similar to the previous embodiment described with reference to FIGS. 1 to 5 and can produce substantially the same effect.

Referring to FIGS. 9 to 17, a further embodiment will be described.

Figure 9:
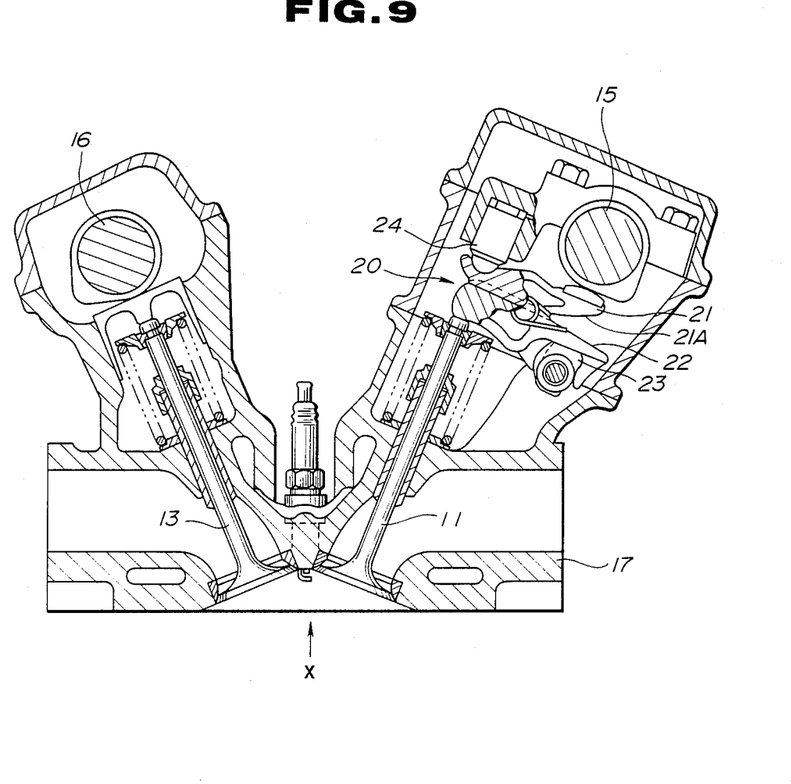
FIG. 9 is a sectional view of a cylinder head incorporating a valve operating mechanism according to a further embodiment of the present invention.
Figure 10:
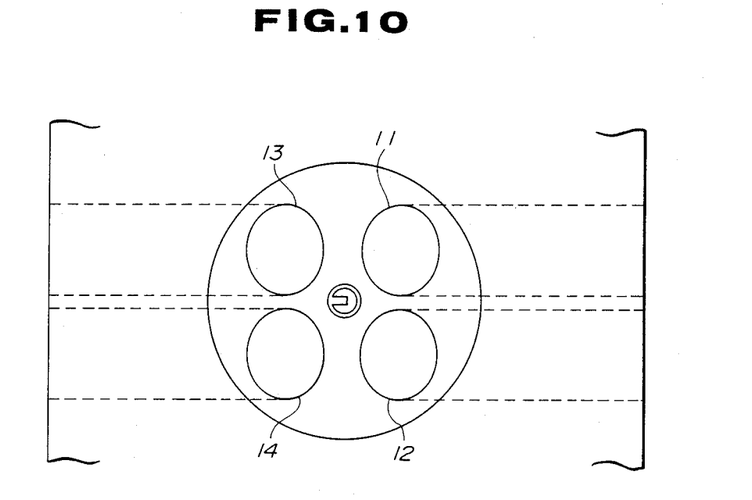
FIG. 10 is a view taken in the direction of the arrow "X" in FIG. 9.

In FIGS. 9 and 10, a four-stroke cycle internal combustion engine is shown as being provided with two exhaust valves 11 and 12 and two intake valves 13 and 14 per cylinder. The intake valves 13 and 14 are driven by a camshaft 16 at a predetermined valve timing shown in FIG. 16. Disposed between the exhaust valves 11 and 12 and a camshaft 15 is a variable valve operating mechanism for varying the valve opening and closing timings and valve lift of one exhaust valve 11.

Figure 11:
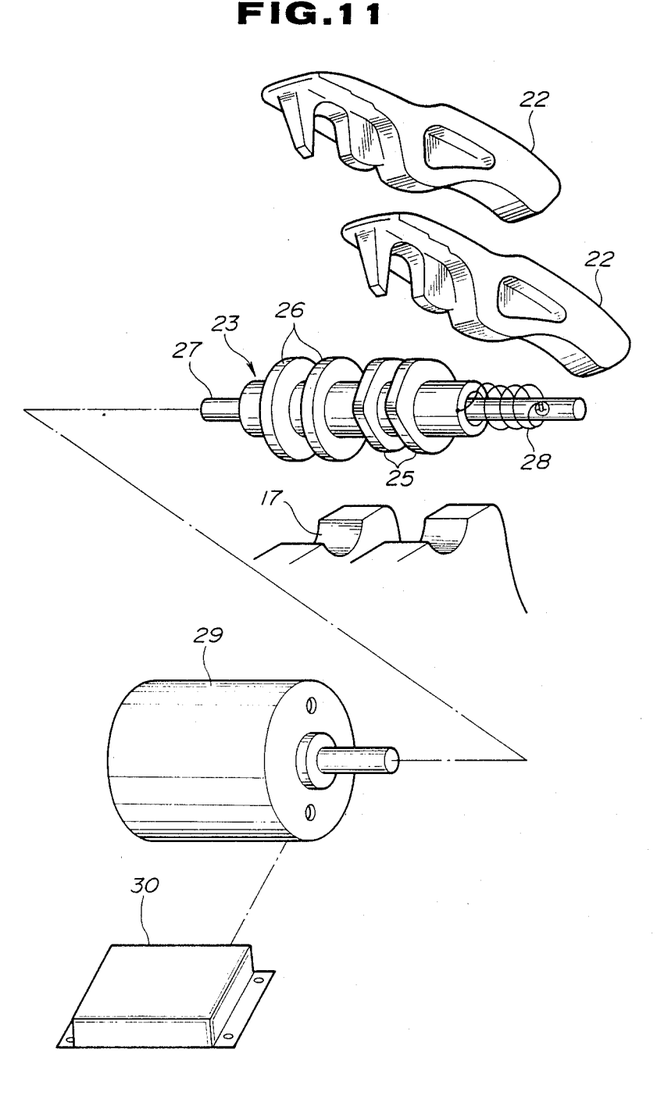
FIG. 11 is an exploded view of the valve operating mechanism of FIG. 9.
Figure 12:
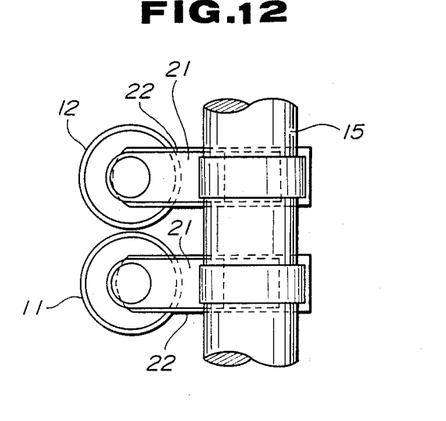
FIG. 12 is a fragmentary top plan view of the valve operating mechanism of FIG. 9.

The variable valve operating mechanism 20, as shown in FIGS. 11 and 12, includes a pair of arms 22 and 22 respectively brought into sliding contact with the valve heads of the exhaust valves 11 and 12, a control cam 23 supporting one end of each arm 22 and a lever 21 interposed between each arm 22 and the camshaft 15.

The camshaft 15 is driven to rotate in unison with the engine. Each lever 21 has one end supported by a hydraulic pivot 24 and the other end brought into sliding contact with the camshaft 15 so as to swing and thereby drive each one of the exhaust valves 11 and 12 to open and close.

Figure 13:
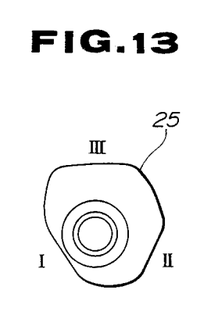
FIG. 13 is a side elevational view of a variable timing cam employed in the valve operating mechanism of FIG. 9.
Figure 14:
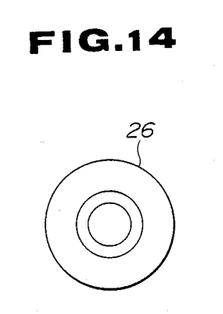
FIG. 14 is a side elevational view of a stationary timing cam employed in the value operating mechanism of FIG. 9.

The control cam 23 is formed with a variable timing cam lobe 25 and a fixed timing cam lobe 26. The profile of the variable timing cam lobe 25, as shown in FIG. 13, has three lift portions I, II and III. In contrast to this, the profile of the fixed timing cam lobe 26, as shown in FIG. 14, is a circle concentric with the axis of rotation of the control cam 23.

The control cam 23 is rotatably supported by a cylinder head 17 and has a concentric opening through which a control shaft 27 extends. The control cam 23 is connected to the control shaft 27 with a spring 28 so as to be rotatable in relation to the control shaft 27. The control shaft 27 is driven to rotate by a stepping motor 29. The operation of the stepping motor 29 is controlled by a control unit 30 in such a manner as will be described hereinafter.

The lever 21 is selectively supported by one of the lift portions I, II and III of the control cam 23 depending upon the rotational or angular position of same, whereby to selectively displace vertically. Since the lower face 21A of each lever 21 is protrusively arcuated in the longitudinal direction, vertical displacement of the support point of the lever 21 causes displacement of the contact point between the lever 21 and the arm 22 in the longitudinal direction thereof, whereby to effect three steps of variations of the the valve timing and valve lift of the exhaust valve 11.

Figure 15:
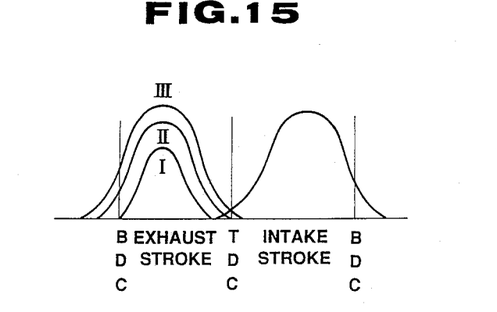
FIG. 15 is a variable valve timing diagram for the valve operating mechanism of the embodiment of FIG. 9.

FIG. 15 is a valve timing diagram for the exhaust valve 11 and the intake valves 13 and 14. As seen from this diagram, when the arm 22 is supported by the lift portion "I" of the control cam 23, the exhaust valve 11 starts opening at the bottom dead center after which the exhaust stroke begins and fullly closes in advance of the top dead center after which the intake stroke begins, thus not causing any valve overlap.

When the arm 22 is supported by the lift portion "III" of the control cam 23, the exhaust valve 11 starts opening in advance of the bottom dead center after which the exhaust stroke begins and fully closes in retard of the top dead center after which the intake stroke begins, thus causing a predetermined valve overlap.

When the arm 22 is supported by the lift portion "II" of the control cam 23, the exhaust valve 11 effects such a valve opening and closing timing and valve lift that is substantially intermediate between those effect when the lift portions I and III are selected to support the arm 22.

Figure 16:
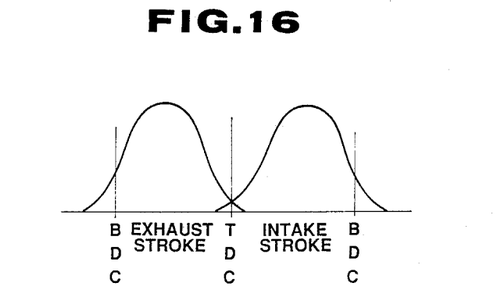
FIG. 16 is a stationary valve timing diagram for the valve operating mechanism of the embodiment of FIG. 9.

FIG. 16 is a valve timing diagram for the fixed timing exhaust valve 12 and the fixed timing intake valves 3 and 4. The fixed timing exhaust valve 12 is adapted to effect a valve lift and a valve opening and closing timing equal to that effected when the lift portion "III" is selected to support the arm 22.

The control unit 30 is adapted to read the rotational or angular position of the control cam 23 based on the map shown in FIG. 8 in response to an engine speed signal and a throttle opening signal and supplies a control signal to the stepping motor 29. In this instance, the map is designed so that the lift portion "I" is selected to support the arm 22 in the middle-speed high-load operation range of the engine corresponding to the operation range in which the drop of the engine output torque occurs, the lift portion "II" is selected to support the arm 22 in the low to middle speed operation range other than the above described middle-speed high-load operation range, and the lift portion "III" is selected to support the arm 22 in the high speed operation range.

The operation will now be described.

During a low to middle speed operation of the engine, the fixed timing exhaust valve 12 and the intake valves 13 and 14 are operated so as to cause a predetermined valve overlap. However, since the variable timing exhaust valve 11 is adapted to be driven by way of the lift portion "II", it scarcely causes a valve overlap with the intake valves 13 and 14, as shown in FIG. 15. Thus, in this phase II operation, the exhaust gases are prevented from flowing the downstream side of the exhaust valve 11 reversely into the cylinder which are drawn by the intake vacuum, thus making it possible to prevent the combustibility deterioration caused by the residual gases, and thereby improving the idling stability.

During a high speed operation of the engine, the variable timing exhaust valve 11 is driven to open and close by way of the lift portion "III" of the control cam 23 and therefore effect the same valve lift and timing as the fixed timing exhaust valve 12. Both of the exhaust valves 11 and 12 have a predetermined valve overlap with the intake valves 13 and 14, thus supplying a large quantity of mixture into the cylinder by utilizing the inertia of the intake mixture and increasing the output torque.

In the meantime, a pressure wave in the exhaust passage in response to opening of the exhaust valves 11 and 12 is promoted at such an engine speed. When the valve overlapping period is set longer, the exhaust gases tend to flow reversely into the cylinder, drawn by intake vacuum through the exhaust valve. As a result the output torque of the engine is decreased.

At the engine speed range in which the above described drop of the engine output torque occurs, the variable timing exhaust valve 11 is driven to open and close by way of the lift portion "I" so as to largely differ in the valve lift and timing from the fixed exhaust valve 12. This phase setting can produce substantially the same effect as the previous embodiment described with reference to FIG. 3.

Figure 17:
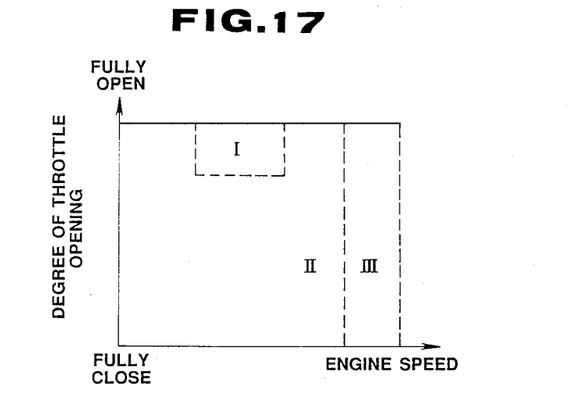
FIG. 17 is a diagram depicting a control map for controlling the rotational position of the variable timing cam of FIG. 13.
Figure 18:
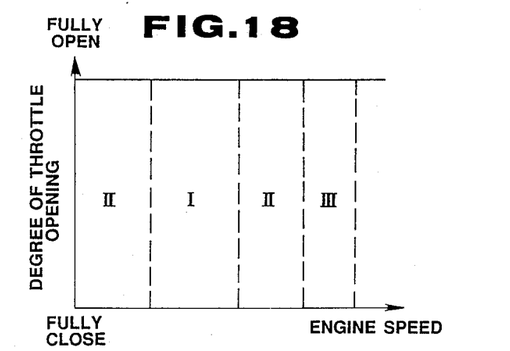
FIG 18 is a diagram similar to FIG. 17 but depicting another control map.

In place of the map of FIG. 17, the angular position of the control cam 23 may be determined by using the map shown in FIG. 18. The map of FIG. 18 is adapted to determine the angular position of the control cam 23 irrespectively of the engine load and to select the lift portion "I" at a predetermined middle speed range in which the drop of the engine output occurs, the lift portion "II" at a low to middle speed range other than the above described middle speed range and the lift portion "III" at a high speed range.

Figure 19:
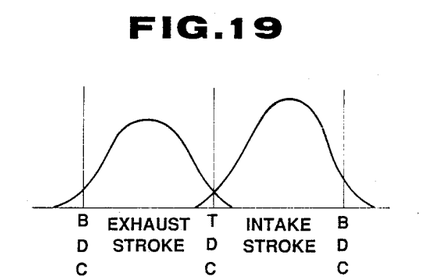
FIG. 19 is a valve timing diagram according to a further embodiment of the present invention.
Figure 20:
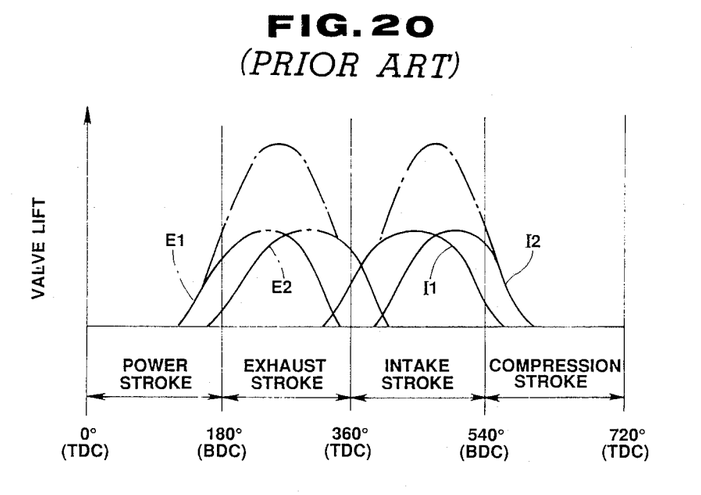
FIG. 20 is a valve timing diagram according to the prior art.

Further, as shown in FIG. 19, the fixed timing exhaust valve 12 may be set to have equal opening and closing timings to the variable timing exhaust valve 12 obtained when the lift portion "III" is selected and have less than the maximum valve lift, i.e., the valve opening and closing speeds being different.

What is claimed is:

1. A valve operating mechanism for an internal combustion engine having a plurality of exhaust valves per cylinder, comprising:
    means for driving at least one of said exhaust valves at a variable valve timing and lift than remainder said exhaust valves in a same cylinder; and
    means for controlling said driving means so as to vary the valve timing and lift of said at least one exhaust valve in accordance with variations in operating condition of said engine.

2. A valve operating mechanism for an internal combustion engine having a plurality of exhaust valves per cylinder, comprising:
    means for driving said exhaust valves at such a valve timing that makes said exhaust valves in a same cylinder start opening at different times and fully close at the same time.

3. A valve operating mechanism as set forth in claim 2 wherein said engine comprises two exhaust valves per cylinder, and closing movements of said exhaust valves are performed at the same speed.

4. A valve operating mechanism as set forth in claim 3 wherein said exhaust valves effect a valve overlap together with a intake valve of said engine.

5. A valve operating mechanism as set forth in claim 2 wherein said engine has three exhaust valves per cylinder, and closing movements of said exhaust valves are performed at different speeds.

6. A valve operating mechanism as set forth in claim 5 wherein said exhaust valves effect a valve overlap together with an intake valve of said engine.

7. A valve operating mechanism for an internal combustion engine having a plurality of exhaust valves per cylinder, comprising:
    means for driving said exhaust valves in a same cylinder at such a valve timing that makes said exhaust valves open and close at the same time and at different opening speeds so as to effect different maximum valve lifts.

8. A valve operating mechanism as set forth in claim 7 wherein said exhaust valves effect a valve overlap together with an intake valve of said engine.

9. A valve operating mechanism for an internal combustion engine having two exhaust valves per cylinder, comprising:
    first drive means for driving one of said exhaust valves at a fixed valve timing and lift;
    second drive means for driving the other of said exhaust valves in a same cylinder at a variable valve timing and lift; and
    control means for controlling said second drive means so as to vary said valve timing of said other exhaust valve in accordance with variations of operation of said engine.

10. A valve operating mechanism as set forth in claim 9 wherein said fixed valve timing and lift makes said one exhaust valve effect a first valve overlap with an intake valve of said engine, and said control means makes said second drive means drive said other exhaust valve at the same valve timing and lift as said one exhaust valve during high speed operation of said engine, at a second valve timing and lift that makes said other exhaust valve open in retard of the time when said one exhaust valve opens, closes in advance of the time when said one exhaust valve close and effect a maximum valve lift smaller than that of said one exhaust valve so that said other exhaust valve fully closes prior to opening of said intake valve during middle-speed high-load operation of said engine, and at a third valve timing and lift which is substantially intermediate between said first and second valve timings and lifts and makes said other exhaust valve effect a predetermined valve overlap during low to middle speed operation of said engine other than said middle-speed high-load operation of said engine.

11. A valve operating mechanism as set forth in claim 10 wherein said middle-speed high load operation of said engine corresponds to an operation range of said engine in which a drop of output torque occurs due to back flow pressures.

12. A valve operating mechanism as set forth in claim 9 wherein said fixed valve timing and lift makes said one exhaust valve effect a first valve overlap together with an intake valve of said engine, and said control means makes said second drive means drive said other exhaust valve at the same valve timing and lift as said one exhaust valve during high speed operation of said engine, at a second valve timing and lift that makes said other exhaust valve open in retard of the time when said one exhaust valve opens, close in advance of the time when said one exhaust valve close and effect a maximum valve lift smaller than that of said one exhaust valve so that said other exhaust valve fully closes prior to opening of said intake valve during particular middle operation of said engine, and at a third valve timing and lift which is substantially intermediate between said first and second valve timings and lifts and makes said other exhaust valve effect a predetermined valve overlap during low to middle speed operation of said engine other than said particular middle-speed operation of said engine.

13. A valve operating mechanism as set forth in claim 12 wherein said particular middle-speed operation of said engine corresponds to an operation range of said engine in which a drop of output torque occurs due to back flow pressures.

* * * * *